United States Patent
Poliashenko et al.

(10) Patent No.: US 10,511,574 B2
(45) Date of Patent: Dec. 17, 2019

(54) METHODS AND APPARATUSES FOR UTILIZING A GATEWAY INTEGRATION SERVER TO ENHANCE APPLICATION SECURITY

(71) Applicant: Hyland Software, Inc., Westlake, OH (US)

(72) Inventors: Yana Poliashenko, Alpharetta, GA (US); Latonia M Howard, Stone Mountain, GA (US)

(73) Assignee: HYLAND SOFTWARE, INC., Westlake, OH (US)

( * ) Notice: Subject to any disclaimer, the term of this patent is extended or adjusted under 35 U.S.C. 154(b) by 211 days.

(21) Appl. No.: 15/476,125

(22) Filed: Mar. 31, 2017

(65) Prior Publication Data
US 2018/0288025 A1    Oct. 4, 2018

(51) Int. Cl.
*H04L 29/06*    (2006.01)

(52) U.S. Cl.
CPC ...... *H04L 63/0281* (2013.01); *H04L 63/0807* (2013.01); *H04L 63/101* (2013.01); *H04L 63/205* (2013.01)

(58) Field of Classification Search
CPC ............ H04L 63/0281; H04L 63/0807; H04L 63/101; H04L 63/205; H04L 63/08; H04L 63/1433; H04L 63/10; H04L 63/0428; H04L 63/06; H04L 63/1441
USPC .......................................................... 726/4
See application file for complete search history.

(56) References Cited

U.S. PATENT DOCUMENTS

| | | | | |
|---|---|---|---|---|
| 8,473,749 B1* | 6/2013 | Madsen | ................. | H04L 67/34 713/187 |
| 9,207,913 B2* | 12/2015 | Chan | ......................... | G06F 8/30 |
| 9,313,172 B1* | 4/2016 | Brandwine | ......... | H04L 63/0236 |
| 9,503,442 B1* | 11/2016 | Griffin | ................ | H04L 63/0838 |
| 9,602,482 B1* | 3/2017 | Roth | ....................... | H04L 63/08 |
| 9,838,379 B1* | 12/2017 | Bryan | ................... | H04W 76/10 |
| 2004/0073634 A1* | 4/2004 | Haghpassand | .......... | G06F 21/50 709/220 |
| 2005/0081026 A1* | 4/2005 | Thornton | ............ | H04L 63/0823 713/156 |
| 2008/0083026 A1* | 4/2008 | Sent | ..................... | H04L 63/062 726/10 |

(Continued)

*Primary Examiner* — Kambiz Zand
*Assistant Examiner* — Mahabub S Ahmed
(74) *Attorney, Agent, or Firm* — Medley, Behrens & Lewis, LLC

(57) ABSTRACT

Embodiments are disclosed for managing interactions between a server application and an external environment while limiting an attack surface of the server application. An example method includes receiving, by communications circuitry of a gateway integration server (GIS) and from a source device in the external environment, a message including an application programming interface (API) call. The example method further includes evaluating, by authentication circuitry of the GIS, whether the API call is authorized. If so, the example method further includes generating, by response circuitry of the GIS, a response to the API call, and transmitting, by the communications circuitry of the GIS and to the source device, the response to the API call. However, if not, the example method includes transmitting, by the communications circuitry of the GIS, an error message to the source device. Corresponding apparatuses and computer program products are also provided.

17 Claims, 8 Drawing Sheets

(56) References Cited

U.S. PATENT DOCUMENTS

| | | | |
|---|---|---|---|
| 2009/0158407 A1* | 6/2009 | Nicodemus | H04L 63/20 726/6 |
| 2009/0235349 A1* | 9/2009 | Lai | H04L 9/3213 726/14 |
| 2010/0146291 A1* | 6/2010 | Anbuselvan | H04L 63/08 713/189 |
| 2010/0251242 A1* | 9/2010 | Sivasubramanian | G06F 12/02 718/100 |
| 2012/0011572 A1* | 1/2012 | Chew | H04L 63/0853 726/4 |
| 2012/0198511 A1* | 8/2012 | Sarferaz | H04L 63/0263 726/1 |
| 2013/0340048 A1* | 12/2013 | Sebastian | H04L 63/08 726/4 |
| 2014/0089202 A1* | 3/2014 | Bond | H04L 9/0822 705/71 |
| 2014/0109085 A1* | 4/2014 | Carrara | G06F 8/61 717/178 |
| 2014/0258441 A1* | 9/2014 | L'Heureux | H04W 12/06 709/217 |
| 2015/0088934 A1* | 3/2015 | Beckman | G06F 21/6227 707/781 |
| 2015/0089224 A1* | 3/2015 | Beckman | H04L 63/105 713/168 |
| 2015/0222601 A1* | 8/2015 | Metz | H04L 63/04 726/9 |
| 2015/0229628 A1* | 8/2015 | Kosim-Satyaputra | G06F 21/121 726/4 |
| 2016/0057107 A1* | 2/2016 | Call | H04L 63/02 726/11 |
| 2016/0261607 A1* | 9/2016 | Carter | G06F 21/41 |
| 2016/0301739 A1* | 10/2016 | Thompson | G06F 9/541 |
| 2017/0006021 A1* | 1/2017 | Karaatanassov | H04L 63/0281 |
| 2017/0012941 A1* | 1/2017 | Subbarayan | H04L 69/16 |
| 2017/0019396 A1* | 1/2017 | Bettenburg | G06F 21/34 |
| 2017/0250853 A1* | 8/2017 | Evans | G06F 21/53 |
| 2017/0264634 A1* | 9/2017 | Carter | H04L 63/10 |
| 2018/0052673 A1* | 2/2018 | Reagan | G06F 8/61 |
| 2018/0109538 A1* | 4/2018 | Kumar | H04L 63/08 |
| 2018/0183586 A1* | 6/2018 | Bhargav-Spantzel | H04L 9/0861 |
| 2018/0248915 A1* | 8/2018 | Beckman | G06F 21/62 |
| 2019/0052643 A1* | 2/2019 | Doshi | G06N 5/04 |

* cited by examiner

METHODS AND APPARATUSES FOR UTILIZING A GATEWAY INTEGRATION SERVER TO ENHANCE APPLICATION SECURITY

TECHNOLOGICAL FIELD

Example embodiments of the present invention relate generally to software security management and, more particularly, to methods and apparatuses that utilize a gateway integration server to administer external access to application programming interfaces of a software product.

BACKGROUND

Many existing software products may be rich in functionality, but not secure enough to be exposed in less-secure deployment environments (such as those utilizing the public Internet). Accordingly, it is necessary to decide whether exposure of such products to insecure environments is worth the cost. If one deploys a product in an insecure environment, then there is a non-zero risk of malicious access or at least attempted malicious access, and this level of risk is unacceptable in many situations, such as when the product exposes application programming interfaces (APIs) that facilitate access to sensitive information (e.g., private customer data). On the other hand, simply preventing deployment of a product walls off possibly important users or clients from having access to the rich functionality provided by the product, which is itself a suboptimal result. A middle ground is thus needed.

In particular, a mechanism is needed to expose only a subset of the functionality of a product and with various levels of authentication and authorization security mechanisms. One response to this problem is to manually modify the security mechanisms of a software product for a particular deployment environment. By doing so, one could theoretically overcome the hurdles noted above, but this solution has its own problems. For instance, this solution would have to be implemented for all application program interfaces (APIs), not only the ones needed for integration into the environment. Moreover, manually updating each software product is a costly approach, especially when the software product is large and exposes many APIs. As a result, a less costly mechanism is needed that would limit which APIs of a software product are available for which deployment environment and with which security options.

BRIEF SUMMARY

Example embodiments described herein address the above deficiencies (among others), and provide methods and apparatuses that limit the attack surface of a product (e.g., server application) through use of a gateway integration server (GIS), which acts a separate application serving the role of a façade for the product. Specifically, external traffic attempting to call any of the server application APIs are routed through the GIS, which fulfills authorized API calls and which rejects unauthorized API calls. To determine whether to allow any given API call, the GIS is provisioned by a server system to identify a set of API calls that are enabled for the deployment, and further to rely upon a set of predefined security models governing accessibility of the enabled APIs. Which APIs are enabled and which security models govern accessibility can be selected based on the risk level posed by the environment of the product deployment and the needs of the applications in the external environment requiring integration with the server application. In doing so, example embodiments described herein retain the ability to secure sensitive data accessible via the server application while also facilitating use of the server application in less secure environments. Example embodiments thus increase the user base that can benefit from the server application. Moreover, example embodiments also avoid the need to manually modify the security mechanisms for every product deployment, which can expedite the process of system integration and avoid errors or omissions that may proliferate when security settings are adjusted manually or in an ad hoc fashion.

Moreover, certain example embodiments further facilitate improvements to system integration by using the GIS as a channel for exposing the set of integration APIs that developers of a software product are promising to maintain, keep backwardly compatible, or deprecate in a fashion friendly to developers of external applications. Because the APIs made available directly from a product are modified a lot more often from release to release than the APIs that are specifically advertised as integration APIs, use of a GIS for this purpose thus provides an organized way to advertise integration APIs (in such embodiments, all APIs that can be enabled on a GIS would be part of the advertised set of integration APIs), thus enabling external users to design system integrations that will be more likely to interact seamlessly with a given software product.

In a first example embodiment, a method is provided for managing interactions between a server application and an external environment while limiting an attack surface of the server application. The method includes storing, by a memory of a gateway integration server (GIS) and during a GIS provisioning procedure, a set of security settings that govern authentication and authorization to access application programming interfaces (APIs) made available by the server application, wherein the set of security settings authorize access to only a proper subset of the APIs made available by the server application. The method further includes receiving, by communications circuitry of the GIS and from a source device in the external environment, a message including an API call, the API call requesting access to a particular API made available by the server application, and evaluating by the authentication circuitry of the GIS and based on the set of security settings, whether access to the particular API is authorized. The method further includes, in an instance in which the authentication circuitry of the GIS determines that access to the particular API is authorized, generating, by response circuitry of the GIS, a response to the API call, and transmitting, by the communications circuitry of the GIS and to the source device, the response to the API call. The method further includes, in an instance in which the authentication circuitry of the GIS determines that access to the particular API is not authorized, generating, by response circuitry of the GIS, an error message, and transmitting, by the communications circuitry of the GIS, the error message to the source device.

In some embodiments, such as when the particular API is not enabled by the set of security settings, the error message is indistinguishable from an error message generated in response to an API call requesting access to an API that does not exist.

In some embodiments, the set of security settings (1) indicates which of the APIs made available by the server application are enabled APIs and (2) includes a set of security models that specifies security options for administering access to the enabled APIs from devices in the external environment.

In some embodiments, evaluating whether access to the particular API is authorized includes determining, by the authentication circuitry of the GIS, whether the set of security settings define the particular API as enabled, wherein the API call is not authorized in an instance in which the set of security settings do not define the particular API as enabled.

In some embodiments, the message from the source device includes a source device credential, and evaluating whether access to the particular API is authorized includes determining, by the authentication circuitry of the GIS and based on the source device credential and the set of security settings, whether the source device is authorized to make the API call, wherein the API call is not authorized in an instance in which the source device is not authorized to make the API call. In some such embodiments, the set of security settings identifies a particular security model applicable to the particular API, wherein the particular security model defines whether the source device is authorized to make the API call. In this regard, the particular security model may be a configured version of a configurable security model available for one or another API depending on the location of the GIS deployment and the level of security required in the context of such deployment.

In some embodiments, generating the response to the API call includes generating, by the response circuitry of the GIS, a secure message by creating a message including the API call and a secure token created using a key selected from a key store provided to a memory of the gateway integration server during a GIS provisioning procedure, transmitting, by communications circuitry of the GIS, the secure message to the server application, receiving, by the communications circuitry of the GIS and in response to transmission of the secure message, a responsive transmission from the server application, wherein the responsive transmission includes the response to the API call, and generating the response to the API call based on the responsive transmission. In some such embodiments, the method includes encrypting the secure message to enhance security.

In some embodiments, the server application is hosted by a server system, and the GIS is hosted in a demilitarized zone external to the server system. In other embodiments, however, the server application and the GIS are hosted in a single network (e.g., on the same instance of an application server, but with different access configurations).

In a second example embodiment, a gateway integration server is provided for managing interactions between a server application and an external environment while limiting an attack surface of the server application. The gateway integration server includes a memory storing a set of security settings that govern authentication and authorization to access application programming interfaces (APIs) made available by the server application, wherein the set of security settings authorize access to only a proper subset of the APIs made available by the server application. The gateway integration server further includes communications circuitry configured to receive, from a source device in the external environment, a message including an API call, the API call requesting access to a particular API made available by the server application. The gateway integration server further includes authentication circuitry configured to evaluate, based on the set of security settings, whether access to the particular API is authorized. Finally, the gateway integration server includes response circuitry configured to, in an instance in which the authentication circuitry determines that access to the particular API is authorized, generate a response to the API call, wherein the communications circuitry is further configured to transmit the response to the API call to the source device, and in an instance in which the authentication circuitry determines that access to the particular API is not authorized, generate an error message, wherein the communications circuitry is further configured to transmit the error message to the source device.

In some embodiments, such as when the particular API is not enabled by the set of security settings, the error message is indistinguishable from an error message generated in response to an API call requesting access to an API that does not exist.

In some embodiments, the set of security settings (1) indicates which of the APIs made available by the server application are enabled APIs and (2) includes a set of security models that specifies security options for administering access to the enabled APIs from devices in the external environment.

In some embodiments, evaluating whether access to the particular API is authorized includes determining, by the authentication circuitry, whether the set of security settings define the particular API as enabled, wherein the API call is not authorized in an instance in which the set of security settings do not define the particular API as enabled.

In some embodiments, the message from the source device includes a source device credential, and evaluating whether access to the particular API is authorized includes determining, by the authentication circuitry and based on the source device credential and the set of security settings, whether the source device is authorized to make the API call, wherein the API call is not authorized in an instance in which the source device is not authorized to make the API call. In some such embodiments, the set of security settings identifies a particular security model applicable to the particular API, wherein the particular security model defines whether the source device is authorized to make the API call. In this regard, the particular security model may be a configured version of a configurable security model available for one or another API depending on the location of the GIS deployment and the level of security required in the context of such deployment.

In some embodiments, generating the response to the API call includes generating, by the response circuitry, a secure message by creating a message including the API call and a secure token created using a key selected from a key store provided to a memory of the gateway integration server during a GIS provisioning procedure, transmitting, by communications circuitry, the secure message to the server application, receiving, by the communications circuitry and in response to transmission of the secure message, a responsive transmission from the server application, wherein the responsive transmission includes the response to the API call, and generating the response to the API call based on the responsive transmission. In some such embodiments, the response circuitry is configured to enhance security of the secure message by encrypting the secure message.

In some embodiments, the server application is hosted by a server system, and the GIS is hosted in a demilitarized zone external to the server system. In other embodiments, however, the server application and the GIS are hosted in a single network (e.g., on the same instance of an application server, but with different access configurations).

In a third example embodiment, a computer program product is provided for managing interactions between a server application and an external environment while limiting an attack surface of the server application. The computer program product includes at least one non-transitory computer-readable storage medium storing computer-executable instructions that, when executed, cause a gateway integration server (GIS) to store, during a GIS provisioning procedure, a set of security settings that govern authentication and authorization to access application programming interfaces (APIs) made available by the server application, wherein the set of security settings authorize access to only a proper subset of the APIs made available by the server application. The computer-executable instructions, when executed, further cause the GIS to receive, from a source device in the external environment, a message including an API call, the API call requesting access to a particular API made available by the server application, and evaluate, based on the set of security settings, whether access to the particular API is authorized. The computer-executable instructions, when executed, further cause the GIS to, in an instance in which the GIS determines that access to the particular API is authorized, generate a response to the API call, and transmit, to the source device, the response to the API call. The computer-executable instructions, when executed, further cause the GIS to, in an instance in which the GIS determines that access to the particular API is not authorized, generate an error message, and transmit the error message to the source device.

In some embodiments, such as when the particular API is not enabled by the set of security settings, the error message is indistinguishable from an error message generated in response to an API call requesting access to an API that does not exist.

In some embodiments, the set of security settings (1) indicates which of the APIs made available by the server application are enabled APIs and (2) includes a set of security models that specifies security options for administering access to the enabled APIs from devices in the external environment.

In some embodiments, evaluating whether access to the particular API is authorized includes determining, by the authentication circuitry, whether the set of security settings define the particular API as enabled, wherein the API call is not authorized in an instance in which the set of security settings do not define the particular API as enabled.

In some embodiments, the message from the source device includes a source device credential, and evaluating whether access to the particular API is authorized includes determining, by the authentication circuitry and based on the source device credential and the set of security settings, whether the source device is authorized to make the API call, wherein the API call is not authorized in an instance in which the source device is not authorized to make the API call. In some such embodiments, the set of security settings identifies a particular security model applicable to the particular API, wherein the particular security model defines whether the source device is authorized to make the API call. In this regard, the particular security model may be a configured version of a configurable security model available for one or another API depending on the location of the GIS deployment and the level of security required in the context of such deployment.

In some embodiments, the computer-executable instructions, when executed, cause the GIS to generate the response to the API call by causing the GIS to: generate a secure message by creating a message including the API call and a secure token created using a key selected from a key store provided to a memory of the GIS during a GIS provisioning procedure; transmit the secure message to the server application; receive, in response to transmission of the secure message, a responsive transmission from the server application, wherein the responsive transmission includes the response to the API call; and generate the response to the API call based on the responsive transmission. In some such embodiments, the computer-executable instructions, when executed, cause the GIS to enhance security of the secure message by encrypting the secure message.

In some embodiments, the server application is hosted by a server system, and the GIS is hosted in a demilitarized zone external to the server system. In other embodiments, however, the server application and the GIS are hosted in a single network (e.g., on the same instance of an application server, but with different access configurations).

In a fourth example embodiment, a method is provided for provisioning a GIS. The method includes receiving, by provisioning circuitry of a server system, system integration requirements, identifying, by the provisioning circuitry of the server system, available security settings facilitating secure operation given the received system integration requirements, receiving, by communications circuitry of the server system, and selection of a set of security settings for the GIS from the available security settings, which may be stored by a database accessible by the server system. The method further includes initiating, by the provisioning circuitry of the server system, distribution of the set of security settings to the GIS. In some embodiments, initiating distribution of the set of security settings to the GIS includes causing transmitting, by the communications circuitry of the server system, the selected set of security settings to the GIS. In some such embodiments, the server system transmits the set of security settings to the GIS through a secure channel, either unilaterally or in response to a secure request from the GIS to the server system.

In a fifth example embodiment, a server system is provided for provisioning a GIS. The server system includes provisioning circuitry configured to receive system integration requirements, identifying available security settings facilitating secure operation given the received system integration requirements. The server system further includes communication circuitry configured to receive selection of a set of security settings for the GIS from the available security settings, which may be stored by a database accessible by the server system. Finally, the provisioning circuitry of the server system is further configured to initiate distribution of the set of security settings to the GIS. In some embodiments, initiating distribution of the set of security settings to the GIS includes causing transmitting, by the communications circuitry of the server system, the selected set of security settings to the GIS. In some such embodiments, the server system is configured to transmit the set of security settings to the GIS through a secure channel, either unilaterally or in response to a secure request from the GIS to the server system.

In a sixth example embodiment, a computer program product is provided for provisioning a GIS. The computer program product includes at least one non-transitory computer-readable storage medium located in a highly secure, restricted environment to which GIS itself does not have direct access. The computer-readable storage medium stores computer-executable instructions that, when executed, cause a server system to receive system integration requirements, identify available security settings facilitating secure operation given the received system integration requirements, and receive selection of a set of security settings for the GIS from the available security settings, which may be stored by a database accessible by the server system. The computer-readable storage medium further stores computer-executable instructions that, when executed, initiate distribution of the set of security settings to the GIS. In some embodiments, the computer-executable instructions, when executed, cause the server system to initiate distribution of the set of security settings to the GIS by causing the communications circuitry of the server system to transmit the selected set of security settings to the GIS. In some such embodiments, the server system is configured to transmit the set of security settings to the GIS through a secure channel, either unilaterally or in response to a secure request from the GIS to the server system.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

Overview

Figure 1:
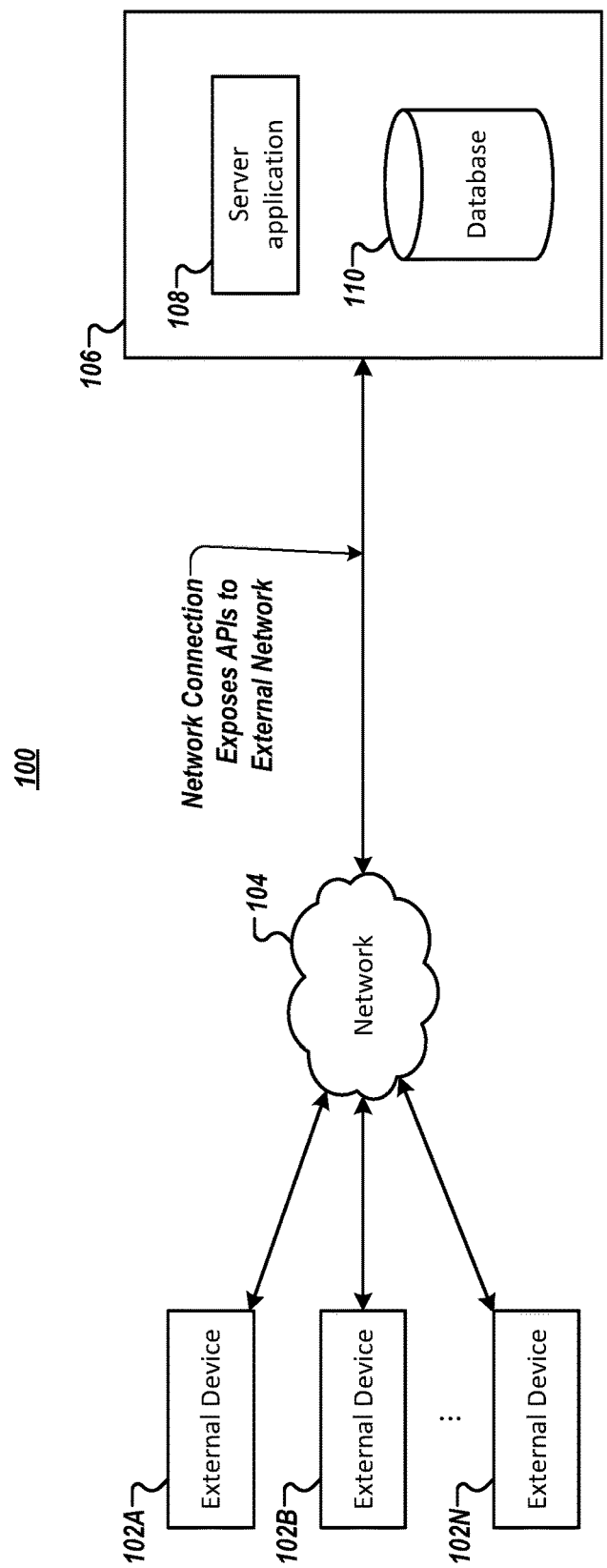
FIG. 1 illustrates a diagram illustrating a typical system in which a server application interacts with external devices.

FIG. 1 illustrates a diagram of a typical integration 100 of a server system 106 with an external environment. As shown in FIG. 1, a series of external devices 102A-102N may interact with a server application 108 of the server system 106 via a network 104. In many cases, this network 104 may comprise the public Internet or another network less secure and/or less controlled than an organization's own intranet. Historically, the server application 108 exposes many APIs to calling applications, and when accessible from an external device, many of those APIs may facilitate access by malicious parties to potentially sensitive data stored in a database 110 or otherwise accessible by the server application 108. Preventing such malicious access historically required walling off the server application 108 from the external sources or manually updating the server application to mitigate the security threat. Both are costly approaches, because they either reduce the usefulness of the server application or require what often amounts to significant manual investment hardening the server application 108.

Figure 2:
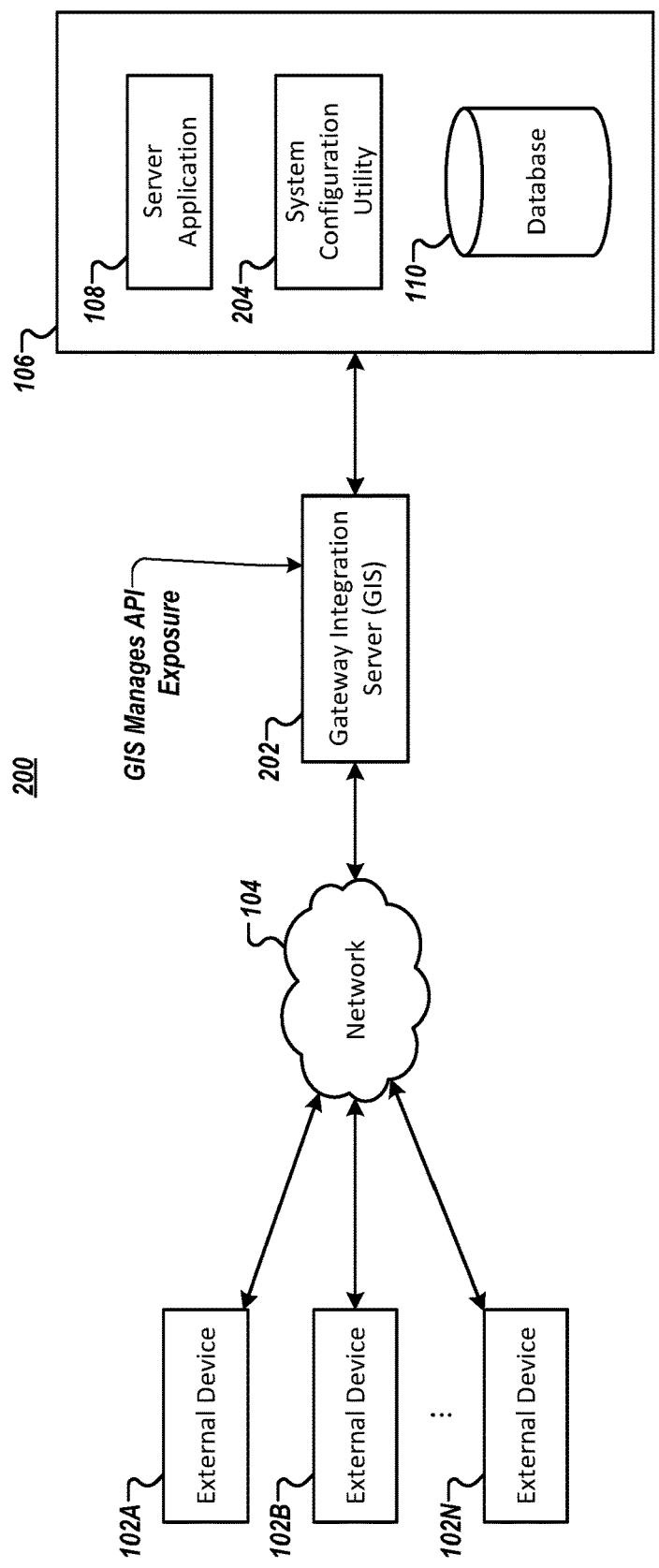
FIG. 2 illustrates a diagram in which interaction of a server application and external devices is managed by a gateway integration server, in accordance with some example embodiments described herein.

FIG. 2 illustrates a diagram of a different integration 200 of the server system 106 with the external environment, according to an example embodiment described herein that provides a solution to these problems and provides other benefits as well. While the external devices 102A-102N, network 104, server application 108, and database 110 can all remain the same, security of the integration can be enhanced through the use of a gateway integration server (GIS) 202 serving the role of a façade for the product. Specifically, external traffic attempting to call any of the server application APIs are routed through the GIS 202, which fulfills authorized API calls and which rejects unauthorized API calls. To enable the GIS to determine whether to fulfill any given API call, the GIS is first provisioned by a system configuration utility 204 (identified below as provisioning circuitry 510 of apparatus 500) of the server system 106 such that the GIS is able to identify a set of API calls that are enabled for the deployment, and can further rely upon a set of security models governing external accessibility to the enabled APIs. Which APIs are enabled and which security models govern accessibility are defined through configuration settings of the system configuration utility 204, which may be preset in the configuration utility 204 or generated through interaction by a user with the system configuration utility 204. In either case, the configuration settings comprise selections from available security settings based on the risk level posed by the environment of the product deployment and the needs of the applications in the external environment requiring integration with the server application 108. In doing so, example embodiments described herein retain the ability to secure sensitive data accessible via the server application 108 while also facilitating use of the server application 108 in less secure environments, and without requiring modification to the underlying design of the server application 108 itself. Example embodiments thus increase the user base that can benefit from the server application 108. Moreover, example embodiments also avoid the need to manually modify the security mechanisms of the underlying server application 108 itself, which can expedite the process of system integration and avoid errors or omissions that may proliferate when security settings are adjusted manually or in an ad hoc fashion.

Moreover, by enforcing the use of predefined security settings in this fashion rather than relying on ad hoc security modifications, certain example embodiments further facilitate improvements to system integration by enabling the GIS to alert applications in the external environment of the current and future API authorizations, thus enabling external users to design system integrations that will operate seamlessly with a given software product.

Figure 3:
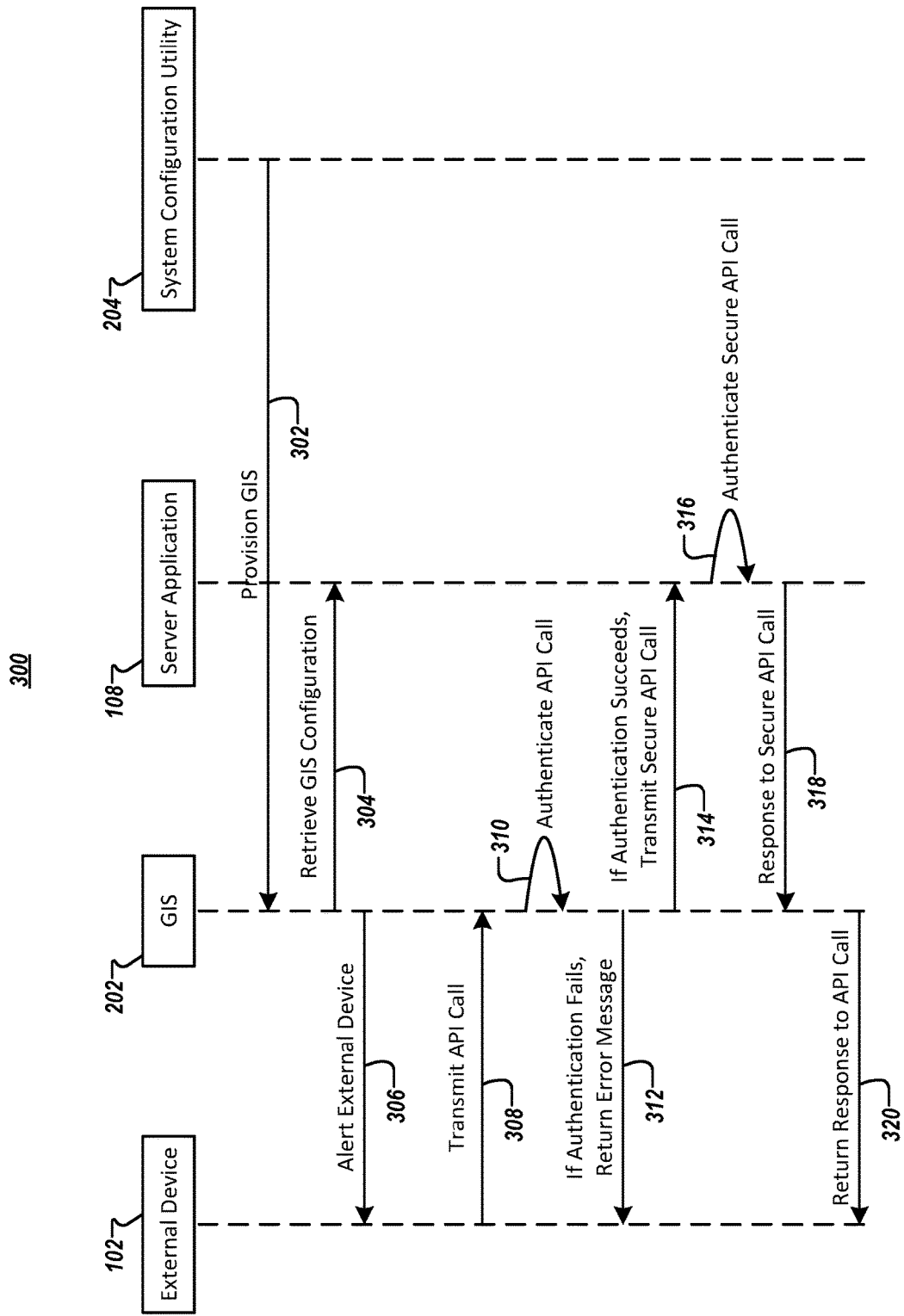
FIG. 3 illustrates a process flow illustrating provisioning of a gateway integration server and subsequent utilization of the gateway integration server to manage API calls made by a source device to access a server application, in accordance with some example embodiments.

Turning now to FIG. 3, a process flow is provided that illustrates provisioning of a GIS and the subsequent utilization of the gateway integration server to manage API calls made by a source device to access a server application, in accordance with some example embodiments. The process flow begins at 302 with the system configuration utility 204 provisioning one or more GISs 202 to operate as an intermediary for interactions between an external device 102 and a server application 108. As part of this function, the system configuration utility 204 may store its configuration settings and/or a set of security settings for the GIS 202 within a database (e.g., database 110) accessible by both the system configuration utility 204 and the server application 108. On startup, the GIS 202 would make a call to the server application 108 to retrieve the set of security settings for the GIS 202, as shown at step 304. This set of security settings would include the data required by the GIS 202 to determine which of the APIs implemented by the server application 108 are enabled, as well as the data required by the GIS 202 to identify appropriate credentials for each API/External Application/GIS instance combination. At step 306, the GIS 202 may alert devices in the external environment (e.g., external devices 102A-102N) that GIS 202 is the point of contact for interaction with server application 108. In some embodiments, step 306 may be performed by the system configuration utility 204 directly (or by another element of server system 106 upon instruction from the system configuration utility 204), or by alternative modes of communications (e.g., a system administrator for server system 106 may interact with a system administrator for the external environment, such as when provisioning requires dissemination of source device credentials to be used for interactions with GIS 202).

Upon provisioning of the GIS, interaction between external devices 102A-102N and the server application 108 may be managed by the GIS 202. For instance, in step 308, a given external device 102 may transmit an API call to the GIS 202. As described below, this API call may identify a particular API ostensibly exposed by the server application 108, and may further include source device credentials in some embodiments. At step 310, GIS 202 may perform an authentication procedure on the API call to determine whether the external device 102 is authorized to make the API call. If the external device 102 is not authorized to make the API call, then at step 312 the GIS 202 may transmit an error message back to the external device 102. Alternatively, if the API call is authorized, then at step 314 the GIS 202 may generate a separate secure API call to the server application 108 hosted by server system 106.

The server application 108 decrypts and fulfills the secure API call at step 316, and at step 318, returns a response to the secure API call back to the GIS 202. Subsequently, at step 320 the GIS 202 generates and returns a response to the external device 102 comprising the response to the API call. In this fashion, the GIS 202 provides a façade preventing direct access by external device 102 to a server application 108 hosted by a server system 106. Moreover, accessibility of various APIs exposed by the server application 108 can be managed without the need to modify the server application 108 itself and without the need to modify the GIS codebase.

Having described example embodiments at a high level, the design of the various devices performing various example operations is provided below.

System Architecture

Methods, apparatuses, and computer program products of the present invention may be embodied by any of a variety of devices. Example embodiments may include a plurality of devices operating in a globally-networked system. In doing so, example embodiments of the GIS may comprise a server device in connection with any of a variety of fixed terminals, such as desktop computers, mainframe devices, kiosks, or the like, or any of a variety of mobile terminals, such as a portable digital assistant (PDA), mobile telephone, smartphone, laptop computer, tablet computer, or the like.

Figure 4:
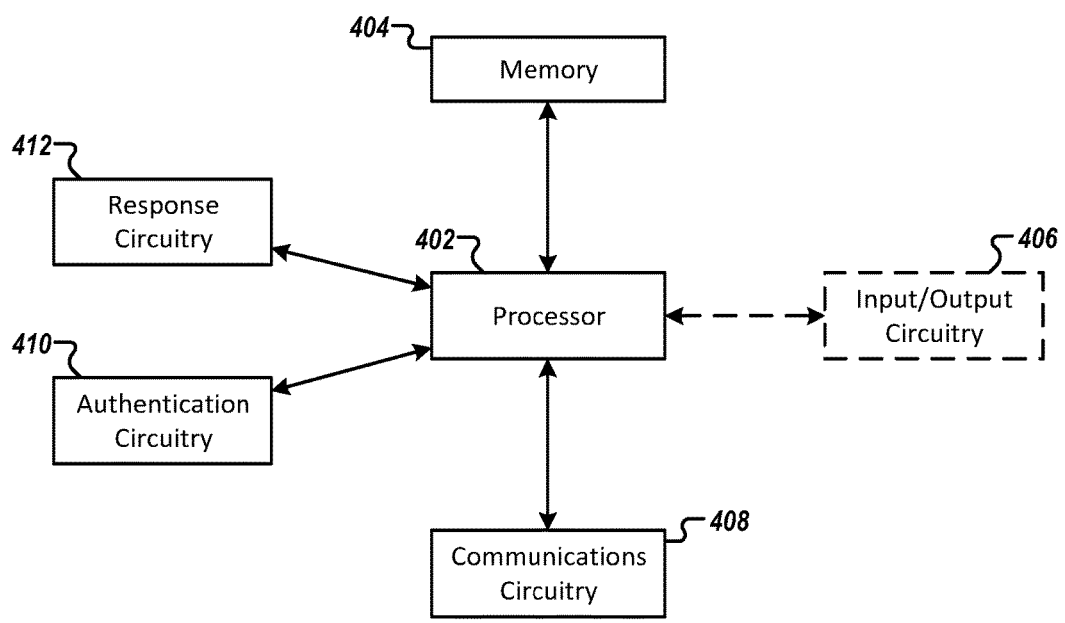
FIG. 4 illustrates a schematic block diagram of example circuitry embodying a gateway integration server that may perform operations in accordance with some example embodiments described herein.

Turning to FIG. 4, an example apparatus 400 is illustrated that may represent a basic set of components of a device embodying an example gateway integration server (e.g., GIS). The apparatus 400 may include a processor 402, a memory 404, and communications circuitry 406. In some embodiments, the device may further include input/output circuitry 408 for interacting with a user, authentication circuitry 410 for determining whether API calls from source devices are authorized, and response circuitry 412 for generating responses to received API calls. The apparatus 400 may be configured to execute the operations described below in connection with FIGS. 7 and 8. Although these components 402-412 are described with some functional descriptors, it should be understood that the particular implementations necessarily include the use of particular hardware. It should also be understood that certain of these components 402-412 may include similar or common hardware. For example, the authentication circuitry 410 and response circuitry 412 may leverage use of the processor 402, memory 404, communications circuitry 406, and/or input/output circuitry 408 to perform their associated functions, and duplicate hardware is not required for the distinct components of the apparatus 400 (although embodiments using duplicated hardware are also contemplated herein). The use of the term "circuitry" as used herein with respect to components of the apparatus therefore includes particular hardware configured to perform the functions associated with the particular circuitry described herein. Of course, while the term "circuitry" should be understood broadly to include hardware, in some embodiments, circuitry may also include software for configuring the hardware components of the apparatus 400.

In some embodiments, the processor 402 (and/or co-processor or any other processing circuitry assisting or otherwise associated with the processor) may be in communication with the memory 404 via a bus for passing information among components of the apparatus. The processor 402 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 402 may be configured to execute instructions stored in the memory 404 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the memory 404 may be non-transitory and may include, for example, one or more volatile and/or non-volatile memories. In other words, for example, the memory may be an electronic storage device (e.g., a computer readable storage medium). The memory 404 may be configured to store information, data, content, applications, instructions, or the like, for enabling the apparatus to carry out various functions in accordance with example embodiments contemplated herein.

The communications circuitry 406 may be any means such as a device or circuitry embodied in either hardware or a combination of hardware and software that is configured to receive and/or transmit data from/to a network and/or any other device, circuitry, or module in communication with the apparatus 400. In this regard, the communications circuitry 406 may include, for example, a network interface for enabling communications with a wired or wireless communication network. For example, the communications circuitry 406 may include one or more network interface cards, antennae, buses, switches, routers, modems, and supporting hardware and/or software, or any other device suitable for enabling communications via a network. Additionally or alternatively, the communication interface 406 may include the circuitry for interacting with the antenna(s) to cause transmission of signals via the antenna(s) or to handle receipt of signals received via the antenna(s). These signals may be transmitted by the apparatus 400 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX), or other proximity-based communications protocols.

In some embodiments, the apparatus 400 may include input/output circuitry 408 that may, in turn, be in communication with processor 402 to provide output to a user and, in some embodiments, to receive an indication of user input. The input/output circuitry 408 may comprise a user interface and may include a display that may include a web user interface, a mobile application, a client device, or the like. In some embodiments, the input/output circuitry 408 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 104, and/or the like).

In addition, the apparatus 400 may also comprise authentication circuitry 410, which includes hardware components designed to determine whether API calls from source devices are authorized. Authentication circuitry 410 may further decrypt encrypted messages received from external devices or from a server application or GIS provisioning circuitry of a server system. Authentication circuitry 410 may utilize processor 402, memory 404, or other hardware component included in the apparatus 400 to perform these functions. Authentication circuitry 410 may further utilize communications circuitry 106 to receive data from a variety of data sources.

Authentication circuitry 410 may utilize processing circuitry, such as the processor 402, to facilitate performance of its various operations, and may utilize memory 404 to store computer instructions that, when executed, cause the authentication circuitry 410 to perform those operations. It should be appreciated that, in some embodiments, authentication circuitry 410 may include a separate processor, specially configured field programmable gate array (FPGA), or application specific interface circuit (ASIC) to perform the above-described functions. Authentication circuitry 410 is therefore implemented using hardware components of the apparatus configured by either hardware or software for implementing these planned functions.

The apparatus 400 may also comprise response circuitry 412, which includes hardware components designed to generate responses to received API calls. Response circuitry 412 may utilize processor 402, memory 404, or any other hardware component included in the apparatus 400 to perform this function. Response circuitry 412 may further utilize communications circuitry 106 to receive data from a variety of data sources, and may rely upon authentication circuitry 410 when necessary to decrypt messages received from these data sources.

Response circuitry 412 may utilize processing circuitry, such as the processor 402, to facilitate performance of its various operations, and may utilize memory 404 to store computer instructions that, when executed, cause the response circuitry 412 to perform its operations. It should be appreciated that, in some embodiments, response circuitry 412 may include a separate processor, specially configured field programmable gate array (FPGA), or application specific interface circuit (ASIC) to perform the above-described functions. Response circuitry 412 is therefore implemented using hardware components of the apparatus configured by either hardware or software for implementing these planned functions.

Figure 5:
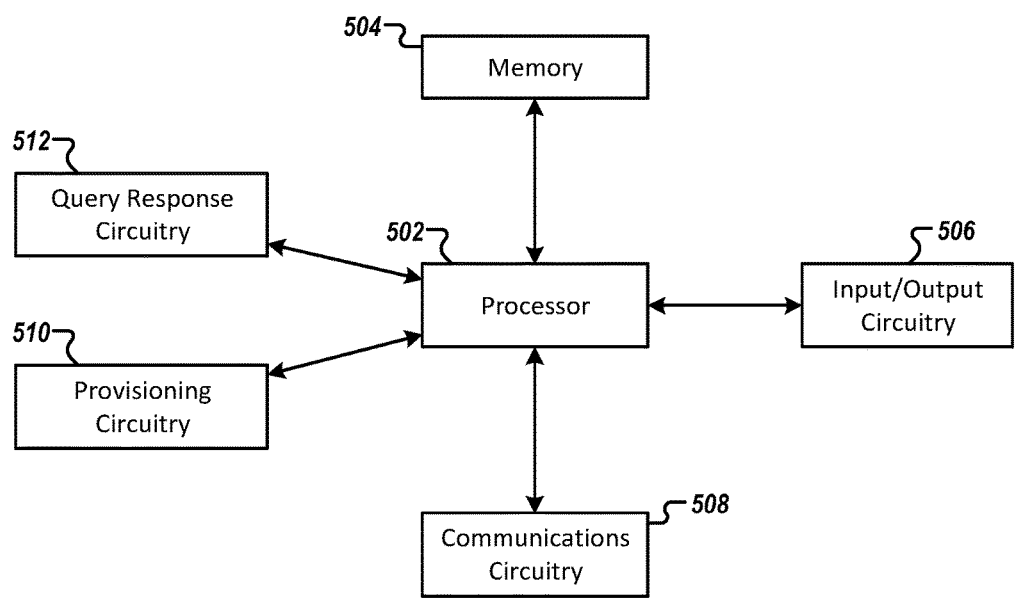
FIG. 5 illustrates a schematic block diagram of example circuitry embodying a server system that may perform operations in accordance with some example embodiments described herein.

Turning next to FIG. 5, an example apparatus 500 is illustrated that may represent a basic set of components of a device embodying an example server system, such as system 106 shown in FIG. 1. The apparatus 500 is described as a single apparatus but in many instances may comprise a distributed system having multiple devices operating in conjunction. For the purposes of this disclosure, the apparatus 500 may be thought of as a server system hosted within a single secure network environment. Accordingly, apparatus 500 may host a server application that can interact with a GIS as described throughout this disclosure, and may further host a provisioning application designed to provision a particular GIS for a particular environment into which the server application will interact.

The apparatus 500 may include a processor 502, a memory 504, communications circuitry 506, and input/output circuitry 508. In addition, the apparatus 500 may further include provisioning circuitry 510 that embodies the server application described herein and which is configured for provisioning new gateway integration servers (e.g., GISs). Furthermore, the apparatus 500 may include query response circuitry 512 for generating and transmitting responses to API calls received from a particular GIS. The apparatus 500 may be configured to execute the operations described below in connection with FIG. 6. Although these components 502-512 are described with some functional descriptors, it should be understood that the particular implementations necessarily include the use of particular hardware. It should also be understood that certain of these components 502-512 may include similar or common hardware. For example, provisioning circuitry 510 and query response circuitry 512 may leverage use of the processor 502, memory 504, communications circuitry 506, and/or input/output circuitry 508 to perform their associated functions, and duplicate hardware is not required for the distinct components of the apparatus 500 (although embodiments using duplicated hardware are also contemplated herein). As with use of the term "circuitry" in connection with the apparatus 400 above, the term "circuitry," when used herein with respect to components of the apparatus 500, includes particular hardware configured to perform the functions associated with the particular circuitry described herein, and while the term "circuitry" should be understood broadly to include hardware, in some embodiments, circuitry may also include software for configuring the hardware components of the apparatus 500.

Because the functionality of processor 502, a memory 504, communications circuitry 506, and input/output circuitry 508 are similar to the functionality described in connection with the similar features of FIG. 4, further description of such functionality is omitted here for brevity only. However, the provisioning circuitry 510 and query response circuitry 512 provide additional functionality not described previously in connection with FIG. 4, so these components are described below in greater detail.

As noted above, the apparatus 500 comprises provisioning circuitry 510, which includes hardware components designed to provision a particular GIS. Provisioning circuitry 510 may utilize any hardware component included in the apparatus 500 to perform its various functions. For instance, provisioning circuitry 510 may utilize input/output circuitry 506 to receive user input regarding the nature and design of a particular GIS that will facilitate interaction with a particular external environment. Similarly, provisioning circuitry 510 may further utilize communications circuitry 106 to transmit to the particular GIS the various security settings needed to manage interactions between source devices within the external environment and a given server application.

Provisioning circuitry 510 may utilize processing circuitry, such as the processor 502, to facilitate performance of its various operations, and may utilize memory 504 to store computer instructions that, when executed, cause the provisioning circuitry 510 to perform those operations. It should be appreciated that, in some embodiments, provisioning circuitry 510 may include a separate processor, specially configured field programmable gate array (FPGA), or application specific interface circuit (ASIC) to perform the above-described functions. Provisioning circuitry 510 is therefore implemented using hardware components of the apparatus configured by either hardware or software for implementing these planned functions.

The apparatus 500 may also comprise query response circuitry 512, which includes hardware components designed to generate responses to received API calls. Query response circuitry 512 may utilize processor 502, memory 504, or any other hardware component included in the apparatus 500 to perform this function. Query response circuitry 512 may further utilize communications circuitry 506 to receive data from any number of GIS installations used for interaction between a given server application and particular external environments.

Query response circuitry 512 may utilize processing circuitry, such as the processor 502, to facilitate performance of its various operations, and may utilize memory 504 to store computer instructions that, when executed, cause the query response circuitry 512 to perform its operations. It should be appreciated that, in some embodiments, query response circuitry 512 may include a separate processor, specially configured field programmable gate array (FPGA), or application specific interface circuit (ASIC) to perform the above-described functions. Query response circuitry 512 is therefore implemented using hardware components of the apparatus configured by either hardware or software for implementing these planned functions.

As described above and as will be appreciated based on this disclosure, example embodiments may be implemented by a plurality of devices, such as fixed devices, mobile devices, backend network devices, and/or the like. Accordingly, embodiments may comprise various means including entirely of hardware or combination of hardware with software. Furthermore, embodiments may take the form of a computer program product stored on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

It should be appreciated, with respect to certain devices embodied by apparatus 400 as described in FIG. 4, computer program instructions and/or other type of code may be loaded onto a computer, processor or other programmable apparatus's circuitry to produce a machine, such that the computer, processor other programmable circuitry that execute the code on the machine create the means for implementing various functions described herein.

Having described specific components of an example device (e.g., apparatus 400) that may be utilized to implement some embodiments of the system utilizing a GIS to enhance security, example embodiments of the present invention are described below in connection with a series of flowcharts.

Operations for Provisioning a Gateway Integration Server

Figure 6:
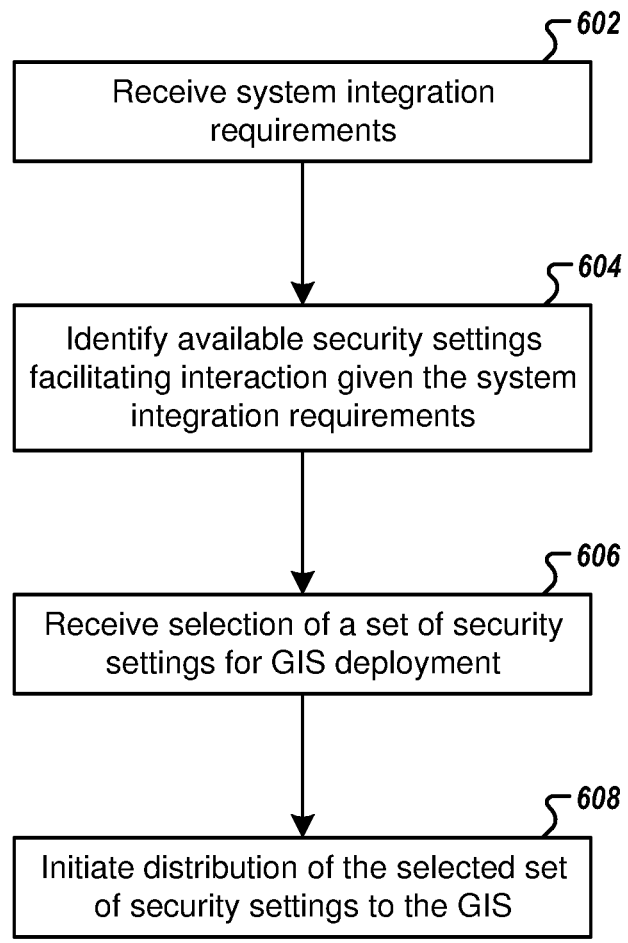
FIG. 6 illustrates a flowchart describing example operations performed by a server system to provision a gateway integration server, in accordance with some example embodiments described herein.

Turning to FIG. 6, a flowchart is illustrated that contain operations for provisioning a GIS to manage interactions between devices in a particular external environment and a particular server application. The operations illustrated in FIG. 6 may, for example, be performed by, with the assistance of, and/or under the control of an apparatus 500 embodying a system configuration utility 204, which in turn may be a component of server system (e.g., server system 106), and more particularly through the use of one or more of processor 502, memory 504, input/output circuitry 506, communications circuitry 508, and provisioning circuitry 510. The example operations described in connection with FIG. 6 contemplate a situation in which the apparatus 500 has been apprised of a particular server application 108 that will interact with devices in a new deployment, and has been apprised of the particular external environment into which the specific server application 108 will be integrated.

Turning now to operation 602, the apparatus 500 includes means, such as provisioning circuitry 510, or the like, for receiving system integration requirements. In this regard, when provisioning a new GIS to manage interactions between the particular external environment and the particular server application, the apparatus 500 must be made aware of the various API calls that are relevant to the interaction. As an initial matter, this requires knowledge of the APIs exposed (e.g., made available) by the server application 108. The provisioning circuitry 510 may identify a set of these APIs either from memory 504 in an instance in which a list of the exposed APIs is stored locally by the apparatus 500 (e.g., if another GIS has been provisioned to manage interactions with the server application 108 in the past), or from input/output circuitry 506, in an instance in which an indication of the set of exposed APIs will be received from a user. In certain embodiments, this list of exposed APIs may be received via communications circuitry 508 in an instance in which the apparatus 500 interrogates another device or component hosting such information.

In any event, from this initial list of exposed APIs, the provisioning circuitry 510 determines which of these APIs, or portions of these APIs, are required for integration into the external environment. A system administrator may pre-define this subset of the APIs and provide it to the provisioning circuitry 510 via input/output circuitry 506. Alternatively, a remote user (e.g., a system administrator operating a device located in the external environment for which the GIS is being provisioned) may provide the subset of APIs for which access is desired, and this set of desired APIs may be evaluated by a user interacting with the provisioning circuitry 510 of the apparatus 500. Still further, the provisioning circuitry 510 may identify the APIs required for system integration by automatically evaluating metadata associated with the server application 108 to distinguish those APIs relevant to system integration from those that are not. As yet another embodiment, the provisioning circuitry 510 may identify the subset of APIs required for integration into the external environment from hardcoded configuration settings stored by a memory 504 of the apparatus 500 or by a separate database accessible from the apparatus 500 but hosted externally (e.g., database 110 from FIG. 1).

Turning now to operation 604, the apparatus 500 includes means, such as provisioning circuitry 510, or the like, for identifying, based on the received system integration requirements, available security settings facilitating secure interaction between the server application 108 and source devices in the external environment. In this regard, the available security settings may be sets of security settings that maintain a minimum standard of security (e.g., security settings that, if implemented, would be estimated to present less than or equal to a predefined level of risk) while facilitating external access to required functionality of the server application 108. Each particular set of security settings may identify a set of APIs for which access is enabled from source devices in the external environment, a set of security models that govern access to each API within the set of APIs, and in some embodiments, a set of source device credentials granting access to particular APIs within the set of APIs. Each set of security settings may further define allowable locations for the GIS to reside and may govern encryption standards required for communication between the GIS and the server application, as well as security standards required for communication between devices in the external environment and the GIS itself. For example, a first set of security settings may demand that, in an instance in which the external environment is accessed via the public Internet, the GIS be located in a demilitarized zone (DMZ) having greater security than the public Internet albeit less security than the server system itself. However, a second set of security settings for the same system integration requirements may be more conservative, and may require locating the GIS within the server system itself.

In addition, the available sets of security settings can include different levels of encryption for communications between the GIS and the server application 108. One available set of security settings may only require use of encryption as a confidentiality mechanism when creating and delivering secure tokens (i.e., keys or credentials). Another set of security settings may require encryption of entire messages that will be transmitted between the GIS and the server application 108 (in addition to the use of encryption for the secure token itself). Accordingly, as part of the configuration of a given API on a given GIS, the available security settings may include various options for encryption, thus enabling a system administrator to make a decision whether to apply encryption to the entire message or use encryption (if encryption rather than hashing is used by a given configured security model associated/enabled for a given API) for a secure token only. In this regard, although applying encryption to an entire message provides an additional level of security, it is likely to degrade performance, identifying multiple available sets of security settings that offer different tradeoffs of security and performance enables a system administrator to determine when there is the need for this additional level of security and effectively provision the GIS appropriately. In some embodiments, the provisioning circuitry 510 of the apparatus 500 may utilize input/output circuitry 506 of the apparatus 500 to provide the system administrator with default recommendations when faced with decisions between alternative sets of security settings. For instance, a default recommendation for public Internet facing deployments of GIS may be to select a set of security settings that require encrypting entire messages, while for integrations within an intranet and/or data center, the apparatus 500 may provide the system administrator with a default recommendation that uses secure tokens while allowing the rest of each message to remain in clear text format.

Turning now to operation 606, the apparatus 500 includes means, such as input/output circuitry 506, provisioning circuitry 510, or the like, for receiving selection of a set of security settings for the GIS from the available security settings. In this regard, the selected set of security settings may include identification of APIs for which access from the external environment will be enabled (and, correspondingly, identification of those APIs for which external access is disabled). Similarly, the selected set of security settings may include identification of one or more security models that are to be used to manage access to one or more of the enabled APIs. Finally, the selected set of security settings may include identification of particular users, applications, and/or devices located within the external environment that will be granted access to particular APIs.

The provisioning circuitry 510 may cause the apparatus 500 to store the selected set of security settings as configuration settings stored in a memory 504 or in a separate database (e.g., database 110 from FIG. 1) that is accessible from the system configuration utility 204 and from server application 108.

Turning now to operation 608, the apparatus 500 includes means, such as input/output circuitry 506, communications circuitry 508, provisioning circuitry 510, or the like, for initiating distribution of the selected set of security settings to the GIS. In this regard, the provisioning circuitry 510 of the apparatus 500 may cause communications circuitry 508 to transmit the selected set of security settings to the GIS for storage in a memory to conclude the GIS provisioning process. In some such embodiments, the apparatus 500 transmits the set of security settings to the GIS through a secure channel, either unilaterally or in response to a secure request from the GIS to the apparatus 500. In some embodiments, devices, and/or applications located within the external environment can use a handshake mechanism to find out which APIs are enabled on the GIS. By doing this, such example embodiments facilitate improvements to system integration by enabling the users of the external environment to design system integrations that will operate seamlessly with the server application 108.

The selected set of security settings may include information needed to govern authentication and authorization to access application programming interfaces (APIs) made available by the server application 108. For instance, the selected set of security settings may include an indication of the APIs made available by the server application 108 that are considered to be enabled. In addition, the selected set of security settings may include a set of security models that specifies security options for administering access to the enabled APIs from devices in the external environment. For instance, access to each enabled API may be governed by a corresponding security model. Through these constituent elements, the selected set of security settings may in some embodiments authorize access to only a proper subset of the APIs made available by the server application. In some embodiments, the selected set of security settings may include a key store comprising one or more encryption keys that can be used by the GIS to facilitate encrypted communication with the apparatus 500. The key store, when stored in a memory of the GIS, may be used for subsequent use managing interactions between devices in an external environment and the apparatus 500. For instance, keys from the key store may be used to create secure tokens by encrypting various sensitive and other data elements (i.e., a timestamp) within the message intended for transmission by the GIS to the server application 108. The secure tokens can then be added to the message to further facilitate authentication and/or integrity of the message from the GIS to the server application 108. Additionally or alternatively, keys from the key store may be used to encrypt entire secure messages generated by the GIS and destined for the server application 108. Finally, the selected set of security settings may further include source device credentials that are to be distributed to a system administrator of one or more devices in the external environment and that can facilitate identification, based on relevant security models included in the selected set of security settings, of one or more users, applications, and/or devices within the external environment that have defined access rights to particular APIs made available by the server application 108. Finally, it will be understood that while access rights are described herein as being grantable on an API by API level, in some embodiments, authorization to make specific API calls may be granted on a more granular level, in which some API calls made by a source device requesting access to certain functions defined by a particular API will be authorized even while other API calls from the source device requesting access to other functions defined by the particular API will not be authorized.

Having described an example procedure for provisioning a GIS in connection with FIG. 6, example embodiments are described below that are performed by a provisioned GIS to manage interactions between a server application and devices located in an external environment.

Figure 7:
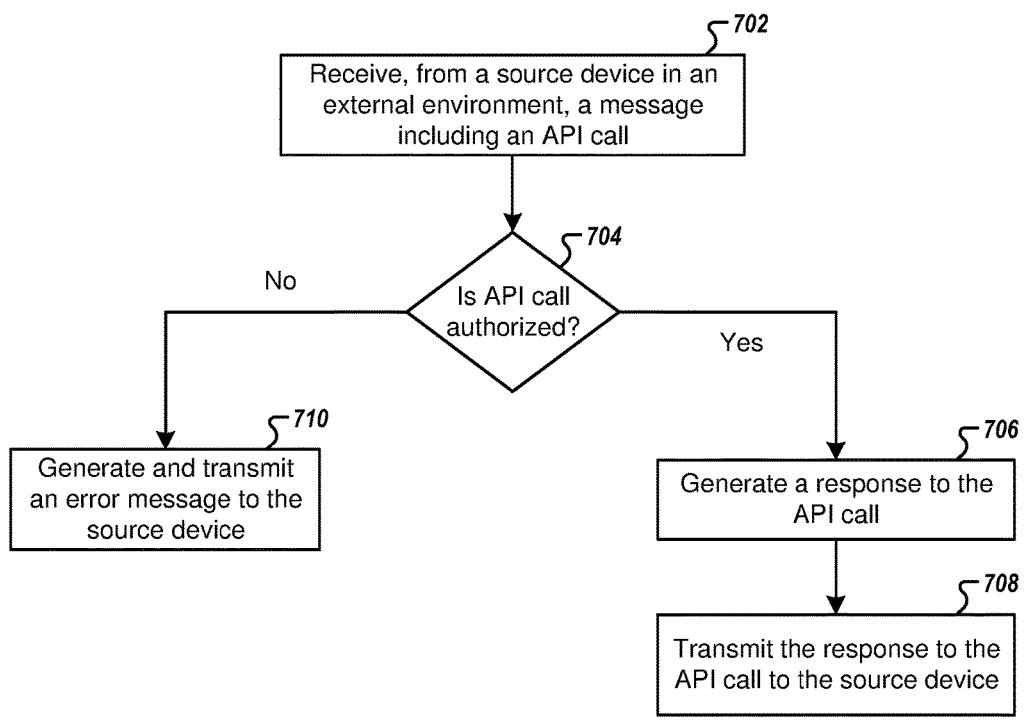
FIGS. 7 and 8 illustrate flowcharts describing example operations performed by a gateway integration server to manage interactions between a source device and a server application, in accordance with some example embodiments described herein.
Figure 8:
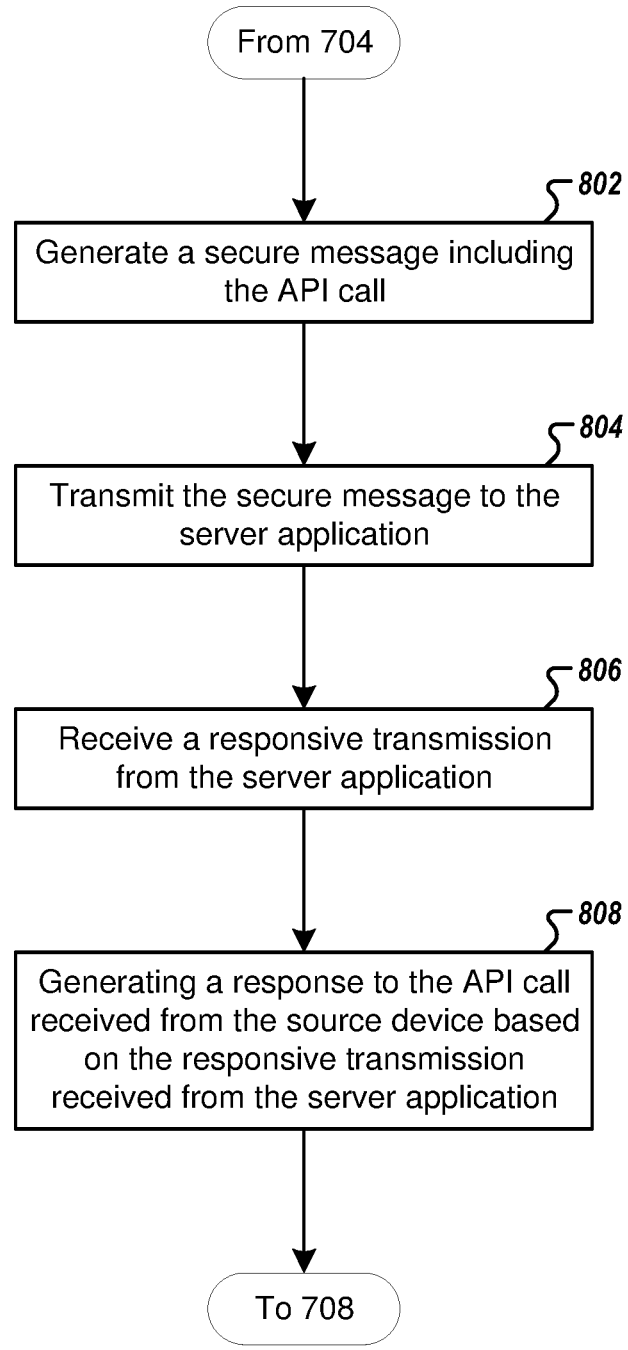

Operations for Managing Interactions Between a Server Application and an External Environment FIGS. 7 and 8 illustrate flowcharts containing operations for managing interactions between a server application and an external environment while limiting an attack surface of the server application. The operations illustrated in FIGS. 7 and 8 may, for example, be performed by a GIS which comprises or is under the control of an apparatus 400 through the use of one or more of processor 402, memory 404, communications circuitry 406, input/output circuitry 408, authentication circuitry 410, and response circuitry 412.

Turning first to FIG. 7, the procedure begins at operation 702, in which the apparatus 400 includes means, such as communications circuitry 406, authentication circuitry 410, or the like, for receiving, from a source device in the external environment, a message including an API call requesting access to a particular API made available by the server application. In some embodiments, the message including the API call may further include source device credentials to identify the requesting party and that can be used to authenticate that the request is actually from the requesting party.

At operation 704, the apparatus 400 includes means, such as authentication circuitry 410, or the like, for determining whether the API call is authorized (e.g., by evaluating whether access is authorized to the particular API to which the API call requests access). Evaluating whether the API call is authorized may be a multi-faceted operation based on the set of security settings stored by the GIS and defined during provisioning of the GIS, as described above in connection with FIGS. 3 and 6. As an initial matter, the set of security settings may indicate which APIs made available by the server application are considered to be enabled APIs (e.g., APIs that are deemed accessible in some situations from source devices in the external environment). In such situations, the authentication circuitry 410 may determine whether the set of security settings define the particular API as enabled. If the API call references an API that is not enabled, then the API call will not be authorized. It will be understood that in some embodiments, the GIS may have no knowledge of APIs made available by the server application 108 that are not enabled, because the provisioning of the GIS only provided the GIS with knowledge of the APIs that are enabled. In such embodiments, determining whether the set of security settings define the particular API as enabled may in fact be a determination of whether the set of security settings identify the particular API at all. If the API is not identified in the set of security settings, the GIS may conclude that the API does not exist, in which case the API call will not be authorized.

However, even if the API call references an API that is enabled, it is not necessarily the case that the authentication circuitry will determine that the API call is authorized. This is because some implementations of the GIS (as embodied by apparatus 400) may further include source credential authentication as part of the authorization process. For instance, the message from the source device may further include a source device credential (e.g., a digital signature), and evaluating whether the API call is authorized may in turn include determining, by the authentication circuitry 510 and based on the source device credential and the set of security settings regarding the server application, whether the source device is authorized to make the API call. In example embodiments utilizing this determination, the API call would not be authorized in an instance in which the source device is not authorized to make the API call.

The set of security settings may further include a set of security models that specifies security options for managing access to the enabled APIs from devices in the external environment. For instance, if a given implementation of the GIS identifies only two APIs that are enabled, each of these two APIs may be governed by a single security model, or the two APIs may be governed by their own individual security models. In either case, the security model governing a given API can provide further security measures that define particular users, applications, and/or devices that are authorized to access specific APIs or, in some embodiments, specific functions within specific APIs. Accordingly, the security model for the particular API identified in the API call may be evaluated by the authentication circuitry 510 to determine whether the source device is authorized to make the API call.

It should further be understood that both types of API call authentication steps described here may be utilized by the GIS in various embodiments. For instance, when the external environment is particularly insecure, an API call may be authorized only when the corresponding API is enabled and when the source device credential is authenticated. Alternatively, in more secure environments, it may merely be necessary to determine only whether the API call is enabled or to evaluate the source device credential, and both determinations may not be needed to determine whether the API call is authorized.

Regardless of how a given embodiment of the GIS determines if the API call is authorized, the procedure advances based on the result of the authorization determination. In this regard, if the apparatus 400 determines that the API call is not authorized, the procedure advances to operation 710. Alternatively, if the apparatus 400 determines that the API call is authorized, the procedure advances to operation 706.

Turning to operation 706, the apparatus 400 includes means, such as response circuitry 412, or the like, for generating a response to the API call. The steps for generating the response to the API call are described in greater detail below in connection with FIG. 8. For continuity of explanation here, however, it should be understood that in many embodiments, generating the response to the API call requires interaction between the apparatus 400 and the server application itself.

In operation 708, the apparatus 400 includes means, such as communications circuitry 406, response circuitry 412, or the like, or the like, for transmitting the response to the API call to the source device.

Finally, operation 710 represents an operation that is reached only when the API call included in the message received from the source device is not authorized. In operation 710, the apparatus 400 includes means, such as communications circuitry 406, authentication circuitry 410, or the like, or the like, for generating and transmitting an error message to the source device. In some embodiments, the error message may be indistinguishable from an error message that would be returned in an instance in which the server application does not include an API corresponding to the API call contained in the message received from the source device (i.e., when the corresponding API does not exist). For instance, this would be the case in embodiments in which the GIS is unaware of APIs made available by the server application but that are not enabled. In other embodiments, the error message may indicate that the API call was syntactically correct, but that the source device does not have appropriate authorization to make the API call. In such embodiments, the error message may further indicate whether the API itself is disabled or whether the source device is enabled by the source device fails to have valid credentials to make the API call.

Turning next to FIG. 8, a series of operations are described for generating a response to the API call received from a source device in an external environment. The procedure illustrated in FIG. 8 illustrates a more detailed example of the steps taking place at operation 706 of FIG. 7. Operation 802 is thus reached in response to the determination at operation 704 of FIG. 7 that the API call received from the source device is authorized.

At operation 802, the apparatus 400 includes means, such as processor 402, response circuitry 412, or the like, for generating a secure message including the API call. As described previously, the GIS provides a façade removing the server application from direct interaction with source devices located in the external environment. Accordingly, even when a source device has made an API call that the GIS has determined is authorized, fulfillment of the API call does not occur directly between the source device and the server application. Instead, fulfillment is indirect and routed through the GIS. Moreover, because the GIS may itself be located in an insecure environment, communication between the GIS and the server application must be hardened to prevent exposure of the server application to security risks. Accordingly, as mentioned previously in connection with FIG. 3, the apparatus 400 generates the secure message by creating a message including the API call and a secure token created using a key selected from a key store provided to the GIS during provisioning of the GIS. In some embodiments, the secure message may also be encrypted in its entirety. In some such embodiments, this encryption process will utilize asymmetric encryption, such as RSA, although it will be appreciated that other suitable encryption methods may alternatively be used for this purpose.

At operation 804, the apparatus 400 includes means, such as communications circuitry 406, response circuitry 412, or the like, for transmitting the secure message to the server application. In this regard, query response circuitry 512 of an apparatus 500 embodying the server application may decrypt the secure message and generate a responsive transmission. In some embodiments, this responsive transmission may be generated in the same fashion that the server application would generate a response to the API call when made in a more traditional system that does not employ an intermediary GIS. However, one difference of some embodiments contemplated herein is that the responsive communication may be encrypted by the query response circuitry 512 to ensure that the data contained therein cannot be maliciously intercepted as it travels between the secure environment in which the server application resides and the GIS, which may be located in a less secure environment.

At operation 806, the apparatus 400 includes means, such as communications circuitry 406, response circuitry 412, or the like, for receiving the responsive transmission from the server application.

At operation 808, the apparatus 400 includes means, response circuitry 412, or the like, for generating a response to the API call received from the source device based on the responsive transmission received from the server application. Some embodiments of this operation may simply forward the message received from the server application in operation 806 on to the source device. However, in other embodiments, additional processing may be necessary. For instance, if the message received from the server application is encrypted, the apparatus 400 may include means, such as authentication circuitry 410 or the like, for decrypting the message, and may further include means, such as response circuitry 412, for generating a new message destined for the source device that includes the response to the API call received from the source device. As another example, if the responsive transmission received from the server device includes information that is ancillary to the API call placed by the source device, then that ancillary information need not be included in the response to the API call generated for transmission back to the source device. In such situations, generating the response to the API call would require separation of the relevant and irrelevant portions of the responsive transmission received from the server device.

Following operation 808, the procedure returns to operation 708 of FIG. 7, for transmission of the response to the API back to the source device located in the external environment and an iteration of the procedure concludes. It will be understood that the procedure described in connection with FIGS. 7 and 8 can be repeated any number of times in response to API calls made from one or more source devices located in the external environment and in doing so, this procedure illustrates an example mechanism by which the GIS acts as a façade for the server application.

As described above, example embodiments described herein thus provide methods and apparatuses that facilitate interactions between a server application and an external environment while limiting an attack surface of the server application. For instance, by selecting which of a server application's APIs are enabled and which security models govern accessibility of those API's, example embodiments described herein provide the ability to secure sensitive data accessible via the server application while also facilitating use of the server application in less secure environments than would otherwise be acceptable. Example embodiments thus increase the user base that can benefit from the server application. Moreover, example embodiments also avoid the need to manually modify the security mechanisms for every product deployment, which can expedite the process of system integration and avoid errors or omissions that may proliferate when security settings are adjusted manually or in an ad hoc fashion. Finally, by enforcing the use of predefined security settings in this fashion rather than relying on ad hoc security modifications, certain example embodiments further facilitate improvements to system integration by enabling the GIS to alert applications in the external environment of current API authorizations and any anticipated forward-looking changes, thus enabling external users to design system integrations that will operate seamlessly with a given software product.

FIGS. 6, 7, and 8 illustrate flowcharts describing the operation of apparatuses, methods, and computer program products according to example embodiments contemplated herein. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus 400 or apparatus 500 and executed by a processor of the apparatus 400 or apparatus 500. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and computer instructions.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for managing interactions between a server application and an external environment while limiting an attack surface of the server application, the method comprising:

storing, by a memory of a gateway integration server (GIS) and during a GIS provisioning procedure, a set of security settings that govern authorization to access application programming interfaces (APIs) made available by the server application, wherein the set of security settings authorize access to only a proper subset of the APIs made available by the server application;

receiving, by communications circuitry of the GIS and
from a source device in the external environment, a
message including an API call, the API call requesting
access to a particular API made available by the server
application, evaluating by the authentication circuitry of the GIS and
based on the set of security settings, whether access to
the particular API is authorized;

in an instance in which the authentication circuitry of the
GIS determines that access to the particular API is
authorized,
generating, by response circuitry of the GIS, a response
to the API call, and
transmitting, by the communications circuitry of the
GIS and to the source device, the response to the API
call; and in an instance in which the authentication circuitry of the
GIS determines that access to the particular API is not
authorized,
generating, by response circuitry of the GIS, an error
message, and
transmitting, by the communications circuitry of the
GIS, the error message to the source device;

wherein the server application is hosted by a server
system, and the GIS is hosted in a demilitarized zone
external to the server system.

2. The method of claim 1, wherein the error message is indistinguishable from an error message generated in response to an API call requesting access to an API that does not exist.

3. The method of claim 1, wherein the set of security settings (1) indicates which of the APIs made available by the server application are enabled APIs and (2) includes a set of security models that specifies security options for administering access to the enabled APIs from devices in the external environment.

4. The method of claim 1, wherein evaluating whether access to the particular API is authorized includes:
determining, by the authentication circuitry of the GIS, whether the set of security settings define the particular API as enabled,
wherein the API call is not authorized in an instance in which the set of security settings do not define the particular API as enabled.

5. The method of claim 1,
wherein the message from the source device includes a source device credential, and
wherein evaluating whether access to the particular API is authorized includes determining, by the authentication circuitry of the GIS and based on the source device credential and the set of security settings, whether the source device is authorized to make the API call,
wherein the API call is not authorized in an instance in which the source device is not authorized to make the API call.

6. The method of claim 5, wherein the set of security settings identifies a particular security model applicable to the particular API, wherein the particular security model defines whether the source device is authorized to make the API call.

7. The method of claim 1, wherein generating the response to the API call includes:
generating, by the response circuitry of the GIS, a secure message by creating a message including the API call and a secure token created using a key selected from a key store provided to a memory of the gateway integration server during a GIS provisioning procedure;
transmitting, by communications circuitry of the GIS, the secure message to the server application;
receiving, by the communications circuitry of the GIS and in response to transmission of the secure message, a responsive transmission from the server application, wherein the responsive transmission includes the response to the API call; and
generating the response to the API call based on the responsive transmission.

8. The method of claim 7, further comprising:
encrypting the secure message to enhance security.

9. A gateway integration server for managing interactions between a server application and an external environment while limiting an attack surface of the server application, the gateway integration server comprising:
a memory storing a set of security settings that govern authorization to access application programming interfaces (APIs) made available by the server application, wherein the set of security settings authorize access to only a proper subset of the APIs made available by the server application;
communications circuitry configured to receive, from a source device in the external environment, a message including an API call, the API call requesting access to a particular API made available by the server application; and
authentication circuitry configured to evaluate, based on the set of security settings, whether access to the particular API is authorized; and
response circuitry configured to
in an instance in which the authentication circuitry determines that access to the particular API is authorized, generate a response to the API call, wherein the communications circuitry is further configured to transmit the response to the API call to the source device, and
in an instance in which the authentication circuitry determines that access to the particular API is not authorized, generate an error message, wherein the communications circuitry is further configured to transmit the error message to the source device;
wherein the response circuitry is configured to generate the response to the API call by:
generating, by the response circuitry, a secure message by creating a message including the API call and a secure token created using a key selected from a key store provided to a memory of the gateway integration server during a GIS provisioning procedure;
causing transmitting, by the communications circuitry, of the secure message to the server application; and
generating the response to the API call based on receipt of a responsive transmission from the server application.

10. The gateway integration server of claim 9, wherein the error message is indistinguishable from an error message generated in response to an API call requesting access to an API that does not exist.

11. The gateway integration server of claim 9, wherein the set of security settings (1) indicates which of the APIs made available by the server application are enabled APIs and (2) includes a set of security models that specifies security options for administering access to the enabled APIs from devices in the external environment.

12. The gateway integration server of claim 9, wherein the authentication circuitry is configured to evaluate whether access to the particular API is authorized by:

determining whether the set of security settings define the particular API as enabled,
wherein the API call is not authorized in an instance in which the set of security settings do not define the particular API as enabled.

13. The gateway integration server of claim 9,
wherein the message from the source device includes a source device credential, and
wherein the authentication circuitry is configured to evaluate whether access to the particular API is authorized by determining, based on the source device credential and the set of security settings, whether the source device is authorized to make the API call,
wherein the API call is not authorized in an instance in which the source device is not authorized to make the API call.

14. The gateway integration server of claim 13, wherein the set of security settings identifies a particular security model applicable to the particular API, wherein the particular security model defines whether the source device is authorized to make the API call.

15. The gateway integration server of claim 11, wherein the response circuitry is further configured to enhance security of the secure message by encrypting the secure message.

16. A method for provisioning a gateway integration server (GIS) to facilitate secure interaction between a server device that makes available a set of application programming interfaces (APIs) and at least one device in an external environment, the method comprising:
    receiving, by provisioning circuitry of a server system, system integration requirements;
    identifying, by the provisioning circuitry of the server system, available security settings facilitating secure interaction between the server device and the at least one device in the external environment given the received system integration requirements;
    receiving, by communications circuitry of the server system, selection of a set of security settings for the GIS from the available security settings, the selected set of security settings identifying a subset of the set of APIs as enabled APIs; and
    initiating, by the provisioning circuitry of the server system, distribution of the selected set of security settings to the GIS;
    wherein the GIS is hosted in a demilitarized zone external to the server system.

17. The method of claim 16, wherein initiating distribution of the set of security settings to the GIS includes:
    causing transmitting, by the communications circuitry of the server system, the selected set of security settings to the GIS.

* * * * *